United States Patent [19]

Taguchi et al.

[11] Patent Number: 5,316,336
[45] Date of Patent: May 31, 1994

[54] AIR BAG APPARATUS

[75] Inventors: Masahiro Taguchi, Hazu; Motonori Tominaga, Okazaki; Toshiaki Matsuhashi, Gamagori, all of Japan

[73] Assignees: Nippondenso Co., Ltd., Kariya; Nippon Soken, Inc., Nishio, both of Japan

[21] Appl. No.: 914,743

[22] Filed: Jul. 17, 1992

[30] Foreign Application Priority Data

Jul. 18, 1991 [JP] Japan .................................. 3-178246
Nov. 1, 1991 [JP] Japan .................................. 3-315522

[51] Int. Cl.$^5$ ........................................... B60R 21/22
[52] U.S. Cl. .............................. 280/730 A; 280/728 R; 280/730 R
[58] Field of Search ............ 280/728 R, 730 R, 730 A

[56] References Cited

U.S. PATENT DOCUMENTS 3,582,107 6/1971 Goetz .............................. 280/730 A
4,966,388 10/1990 Warner et al. ....................... 280/730
5,072,966 12/1991 Nishitake et al. ............... 280/730 A
5,135,253 8/1992 Hirashima et al. .................. 280/732

FOREIGN PATENT DOCUMENTS 2220620 1/1990 United Kingdom ........... 280/730 A

Primary Examiner—Eric Culbreth
Attorney, Agent, or Firm—Cushman, Darby & Cushman

[57] ABSTRACT

An air bag is stored in a folded state in a space in a door or an arm rest, laterally of a passenger in a cabin. An inflator for generating a flow of gas is also stored inside the door or the arm rest. When a collision occurs, the inflator discharges a flow of gas directed upward and introduced into the air bag, which causes the air bag to be inflated so that the inflated air bag occupies a space between a passenger and the door or the vehicle body, laterally of passenger. As a result, the passenger is cushioned from any shock caused by the collision, to thereby protect the passenger from injury.

4 Claims, 11 Drawing Sheets

AIR BAG APPARATUS

BACKGROUND OF THE INVENTION

1. Field of the Invention

The present invention relates to an air bag apparatus mounted to a vehicle, such as an automobile, and capable of protecting a passenger in an accident such as a side body collision.

2. Description of Related Art

To ensure the safety of passengers upon a vehicle collision, such as between automobiles or with a fixed object, in addition to a seat belt device usually employed, an air bag device has recently been proposed and used in automobiles. This device includes an air bag which, upon a collision, is inflated so that the inflated bag occupies a space between the passenger and a dashboard and/or a steering wheel of the vehicle, to cushion the passenger and prevent the passenger from being injured.

In such a device, the air bag is arranged in front of the passenger, and this is effective for protection during an accident such as a head-on collision, where the collision occurs in the direction of the movement of the vehicle. Nevertheless, passenger safety would be improved if provisions are made to protect the passenger during a side body collision of the vehicle since the passenger may collide with a side door or wall of the vehicle (e.g., when the vehicle side-swipes a fixed object or another vehicle or the vehicle is overturned at a high speed). Namely, the provision of the seat belt is very effective during a head-on collision, but is usually not effective when a side body collision occurs. Thus there is a strong demand for the provision of an additional means able to effectively function to protect the passenger even during a side body collision.

Accordingly, an air bag apparatus has been proposed wherein an air bag is arranged in a side door, laterally of a passenger, and when a side body collision occurs, is inflated so that the inflated air bag occupies a space between the side door and the passenger. (See U.S. Pat. No. 4,966,388). In this prior art, the air bag is stored in a space inside a door, laterally of a passenger, and a hinged cushion panel is provided for confining the air bag in the door. When a collision occurs, an inflator ejects air laterally of the door and causes the air bag to be inflated. The inflated air bag pushes against hinged panel so that the panel is pivoted about the bottom axis thereof, which causes a space to be created at the top end of the panel through which the air bag is inflated to thereby occupy the space between the door and the passenger.

In this prior art, the gas initially ejected laterally of the plane of the door, to pivot the panel about the bottom end thereof and create a space at the top of the panel through which the air bag is extended, but this means that only a poor use of the energy of the ejected gas flow is made, and thus it is difficult to ensure that the inflated air bag quickly occupies the space between the door and the passenger when a collision occurs.

SUMMARY OF THE INVENTION

An object of the present invention is to provide an air bag assembly capable of obtaining an effective use of the energy of the gas discharged for inflating the air bag, to thereby ensure that the inflated air bag is quickly extended into a space between the passenger and the vehicle body, laterally of the passenger.

According to the present invention, the air bag apparatus provided is adapted to be mounted to a body of a vehicle, for protecting a passenger, said apparatus comprising:

an air bag;

means for storing said air bag, in an at least a partly retracted condition, at a location inside the vehicle body laterally of the passenger, and;

means for ejecting a flow of gas, when required, directly upward into the air bag so that the air bag is inflated upward and the inflated bag occupies a space between the passenger and the vehicle body, laterally of the passenger.

When a collision (side body crash) occurs, the injecting means is operated to discharge a flow of gas directed upward into the air bag, which causes the air bag to be quickly inflated upward, and thus the inflated air bag can very quickly occupy the space between a passenger and the vehicle body, laterally of the passenger, to thus cushion the passenger against a shock stemming from the crash. The air bag can be advantageously stored in a space inside the area of the engine body, which allows an effective use of the space inside the body, without reducing the cabin space.

DESCRIPTION OF THE PREFERRED EMBODIMENTS

FIGS. 1 to 4 illustrate a first embodiment of the present invention, wherein reference numeral 10 denotes a door of a vehicle, a seat for a passenger being located adjacent to and laterally of the door 10. The present invention is not, however, directed only to an application thereof to the door, i.e., the present invention can be employed even when not applied to the door of a vehicle, and in this case, a side wall adjacent to and laterally of a passenger will correspond to the door 10 in the shown embodiment. The door 10 or the side wall corresponding to the door 10, as well known, is constructed from an outer panel 12 and an inner panel 14, which are obtained by stamping sheets of steel in respective moulds, and then joining the panels 12 and 14 together by a suitable means, such as spot welding, together with appropriate members for a reinforcement and ornamentation thereof. Such a construction of the door 10 of the vehicle provides therein a space 16, which is usually sectioned, and a part of such a space 16 provides room for a necessary movement of a side window panel 18. A reference numeral 20 is window frame.

Figure 1:
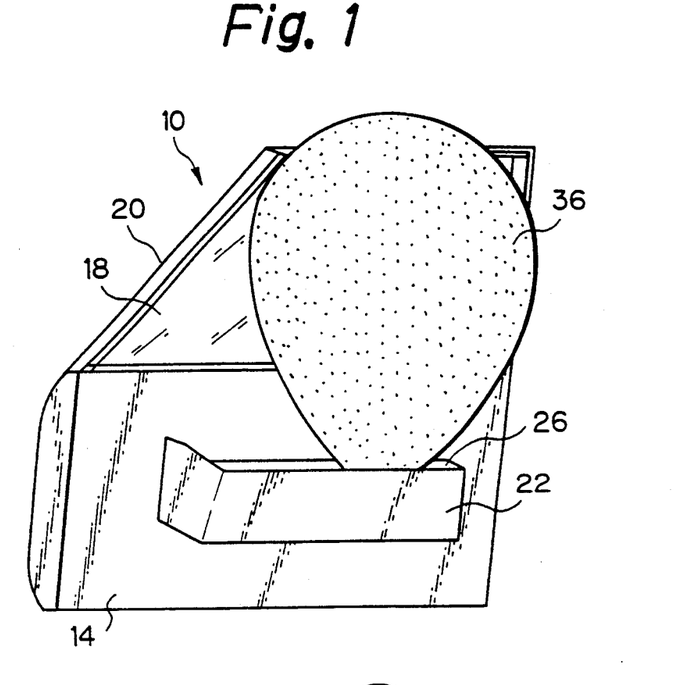
FIG. 1 is a perspective view schematically illustrating an arrangement of an air bag in an inflated condition, according to the present invention.
Figure 2:
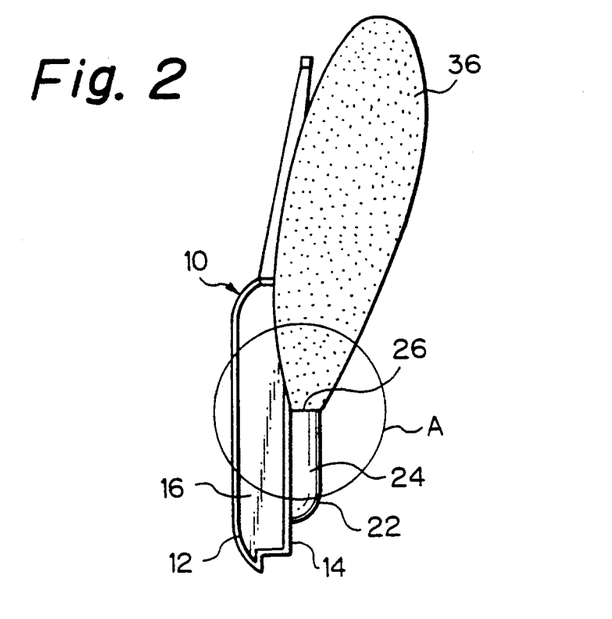
FIG. 2 is similar to FIG. 1, but is cross sectional view taken along a plane transverse to a door of a vehicle.

The inner panel 14 of the door 10 (or a side wall) laterally of a passenger has, as an integral part thereof, an arm rest 22, usually made of a synthetic resin or metal sheet, or even wood, and usually provided with an outer layer member for ornamentation. The arm rest 22, to which the concept of the present invention is applied, is provided at least partly inside thereof with a recess or cavity for creating an inner chamber 24. The chamber 24 has an opening 26 at the top wall of the arm rest 22, which opening 26 can extend to the side wall of the cabin. A cover (not shown) is provided for closing the opening 26 so that the arm rest 24 can maintain its designated function of supporting an arm of the passenger. A pad made of a soft material is usually provided on the outer surface of the cover. The cover has a pivotable connection, such as a hinge, for obtaining a movement of the cover for selectively opening or closing the opening 26.

Figure 3:
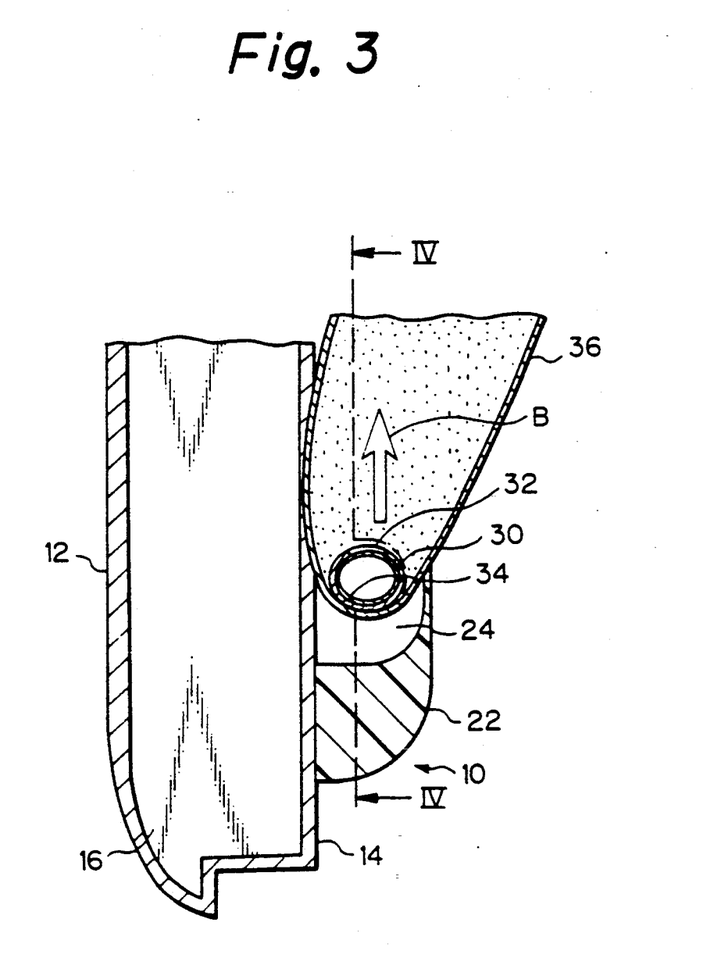
FIG. 3 is an enlarged, detailed view of a part A circled in FIG. 2.
Figure 4:
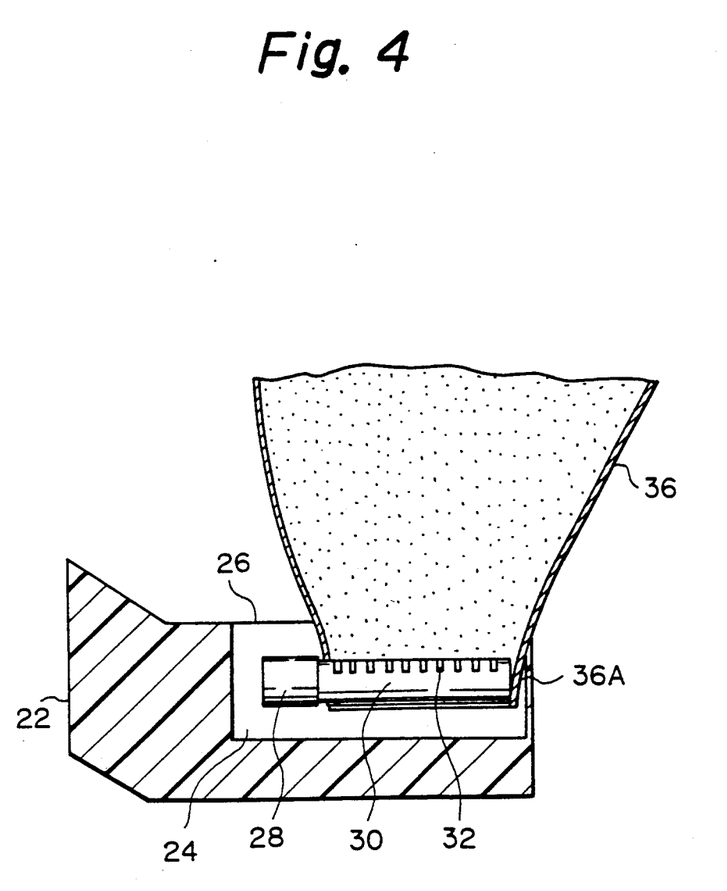
FIG. 4 is a view taken substantially along a line IV in FIG. 3.

As shown in FIG. 4, provided in the chamber 24 is an inflator 28, and a gas discharge pipe 30 connected to the inflator 28. The pipe 30 extends horizontally along the width of the door 10. The inflator 28 is of a substantially the same construction as that used in a conventional air bag provided at the front side of the passenger. Namely, the inflator 28 is packed therein with a gas generating material which is ignited when a sensor (not shown) detects a crash, and causes a large amount of gas to be generated and directed to the gas discharge pipe 30. The top surface of the gas discharge pipe 30 is provided with a plurality of nozzles 32, from which jets of the gas are ejected toward the air bag 36, to inflate same. As shown in FIG. 3, the gas discharge pipe 30 is provided along the inner periphery thereof, with a filter 34 made of a porous sheet allowing only the gas to pass therethrough; the gas being ejected into the air bag 36, as shown by an arrow B in FIG. 3.

In the first embodiment shown by FIGS. 1 to 4, the air bag 36, when inflated by the gas, has a dimension sufficiently large to cover an upper half of the body and head of the passenger. As shown in FIG. 4, the air bag 36 has an open bottom end 36A connected to the gas discharge pipe 30 so that the gas flows ejected therefrom are received by the air bag 36 without escaping to the atmosphere. The air bag 36, similar to a conventional bag, is made of a sheet of rubber or synthetic resin material or an air tight fabric. During a usual or non-operating condition, the air bag is in a folded, compact condition, like a bellows, and thus can be neatly stored around the gas discharge pipe 30, or inside the chamber 24 of the arm rest 22. (See FIG. 7.)

According to the air bag apparatus as shown in FIGS. 1 to 4, a crash sensor (not shown) is provided and responds to a change in the speed of the vehicle (degree of acceleration or degree of deceleration) or responds to a deformation of a part of a body of the vehicle, caused by a collision with another vehicle or object, to then output a signal. The output of such a signal causes the gas generating material in the inflator 28 to be ignited, and accordingly, a large amount of gas is ejected into the air bag 36 via the nozzles 32 of the discharge pipe 30. This rapid increase in the pressure inside the air bag 36 causes the air bag 36 to be inflated, the cover to open, and the bag 36 to be extended out of the opening 26, so that a space between the door 10 (or the side wall) and the passenger, including the head, is occupied by the air bag 36, which effectively cushions any shock to the passenger, in particular, the head of the passenger, to thereby prevent the passenger from being injured.

The provision of the gas nozzles 32 at the upper surface of the gas injection pipe 30 in the first embodiment shown by FIGS. 1 to 4 allows the gas ejected from the nozzles 32 to be directed mainly upward, as shown by the arrow B in FIG. 3, and thus the bag 36 is quickly extended (inflated) into the space between the passenger and the door 10 or the side wall the vehicle. Furthermore, according to this embodiment, substantially all of the parts constructing the air bag apparatus are stored in the arm rest 22, which is advantageous in that the provision of the air bag apparatus does not substantially affect designated functions of other parts of the vehicle, and in that an arm rest with the air bag apparatus according to the invention can be easily mounted in place of an arm rest having a conventional construction.

Figure 5:
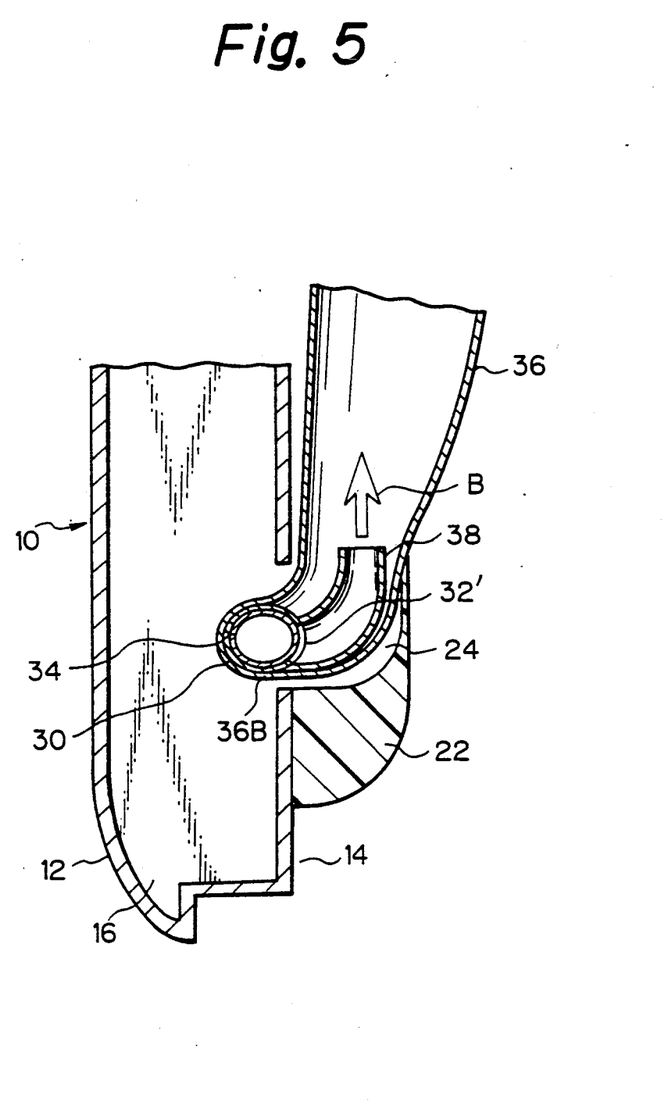
FIG. 5 is similar to FIG. 3, but shows another embodiment.

FIG. 5 shows another embodiment wherein the gas discharge pipe 30, which extends horizontally along a plane of the door 10, has a single gas ejecting slit 32' of a relatively large dimension, which is opened laterally of the pipe 30, in place of the longitudinally spaced ejecting nozzles 32. A gas direction changing pipe 38, which is an elbow-shaped pipe, is laterally connected to the pipe 30 so that the gas ejected from the ejecting slit 32 is received by the elbow pipe 38. The other end of the elbow pipe 38 is vertically opened to the space inside the air bag 36, so that the gas in the elbow pipe 38 is discharged upward into the air bag 36, as shown by an arrow B. In place of the separate pipe 38 fixed to the gas discharge pipe 30, the latter may have an end which is bent to form a portion functioning in the same way as the elbow pipe 38. In this case, in place of the filter 34 along the inner periphery of the pipe 30, a filter is mounted at the opening of the pipe 30. In this embodiment, a plurality of elbow pipes 38 can be connected to the discharge pipe 30.

The air bag 36 has an extended bottom portion 36B which encircles at least part of the gas discharge pipe 30 and effectively prevents gas from leaking at portions where the gas discharge pipe 30 is connected to the gas ejection direction changing pipe 38. The construction of the bottom portion 36B encircling at least a part of the gas discharge pipe 30 is advantageous when a plurality of flow direction changing pipes 38 are provided.

Another feature of the embodiment shown in FIG. 5 is that the gas discharge pipe 30 together with an inflator (which is similar to that in FIG. 4 but is not shown in FIG. 5) is partly located in the space 16 inside the door 10 or vehicle body. Such an arrangement of the parts in the door inside the space 16 is relatively difficult to realize, when the air bag assembly is connected to an existing door 10 or vehicle body, but this arrangement for obtaining an inside door space in which the air bag assembly is stored can be relatively easily realized in the case of a newly designed car. This arrangement makes it possible to obtain a relatively large air bag assembly, since a location of a part thereof can be moved so that it occupies the space 16 in the door 10, which allows a relatively large air bag 36 to be stored in the very limited space 24 inside the arm rest 22. Furthermore, the space 16 inside the door 10 will be sufficiently large to store the inflator 28, even if it is large size.

Figure 6:
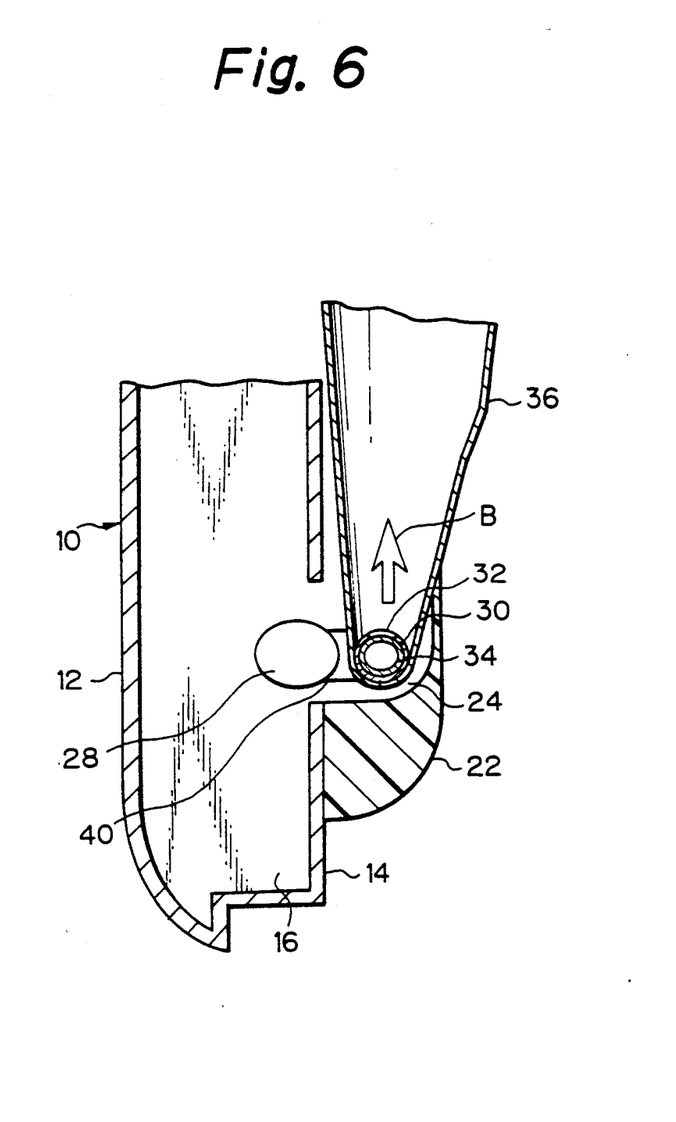
FIG. 6 and 7 show still another embodiment.

FIG. 6 shows a third embodiment of the present invention, which features a manifold 40 for connecting the inflator 28 arranged in the chamber 16 with the gas discharge pipe 30 arranged in the chamber 24 in the arm rest 22. The manifold 40 can be constructed as two pipes connected to opposite ends of the gas discharge pipe 30, so that the two pipes are perpendicular to the gas discharge pipe 30, whereby two gas passageways from the inflator 28 are created. The construction of the manifold 40 is advantageous in that the gas generated in the inflator 28 is introduced into the air bag 36 with as small as possible a flow resistance. The gas discharge pipe 30 has, as in FIG. 3, a plurality of upwardly opened gas ejection nozzles at the upper wall of the gas ejecting pipe 30, which allows upwardly directed flows of the ejected gas to be obtained, from the nozzles toward the space inside the air bag 36.

Figure 7:
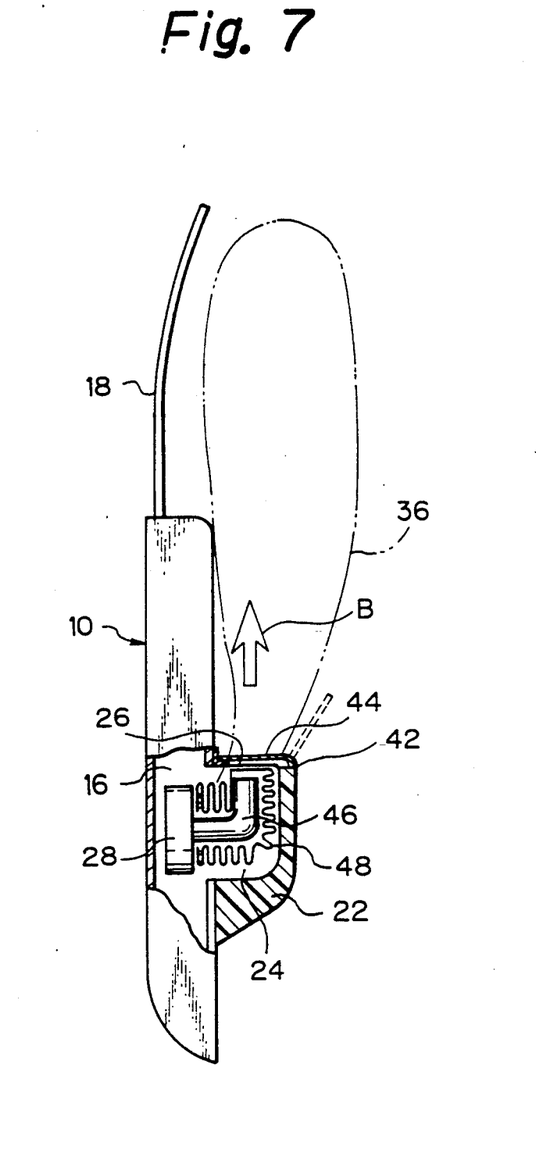

FIG. 7 shows another embodiment wherein a cover 44, which is omitted in the previous embodiment for the sake of the simplicity, is shown. The cover 44 usually closes the upper opening 26 at the top wall of the wall of the arm rest 22, so that the air bag device is stored in the space 16 inside the door 10 and the space 24 inside the arm rest 22. The cover 44 is connected, via a not shown hinge means, to top wall of the arm rest 22 along a longitudinal side thereof, so that the cover 44 can be moved about the member 42 from a closed line to a dotted line as shown in FIG. 7, when the gas from the inflator 28 is introduced into the air bag 36 via a flow direction changing pipe 46, which is an elbow-shaped pipe connected at one end thereof to the inflator, and at the other upwardly bent end, opened to the space inside the air bag 36. The air bag 36 is usually stored in the space 24 inside the arm rest 22 in a folded state, and the cover 44 closes the top opening 26 as shown by the solid line. When the inflator 28 is energized, a high pressure gas flow is created and is directed into the inside of the air bag 36, so that the bag 36 is extended out of the chamber 24 of the arm rest 22, while the cover 44 is outwardly opened as shown by the dotted line about the hinge means. As a result, the inflated air bag 36 occupies the space between the door 10 and the passenger.

It should be noted that the cover 44 can be connected to the top wall of the arm rest by a hinge mounted at a position opposite to that of the hinge 42 in FIG. 7. Therefore, the hinge 42 may be eliminated, and in this case, the lid or cover 44 is merely fitted to an edge portion of the opening 26 at the top wall of the arm rest 22.

Figure 8:
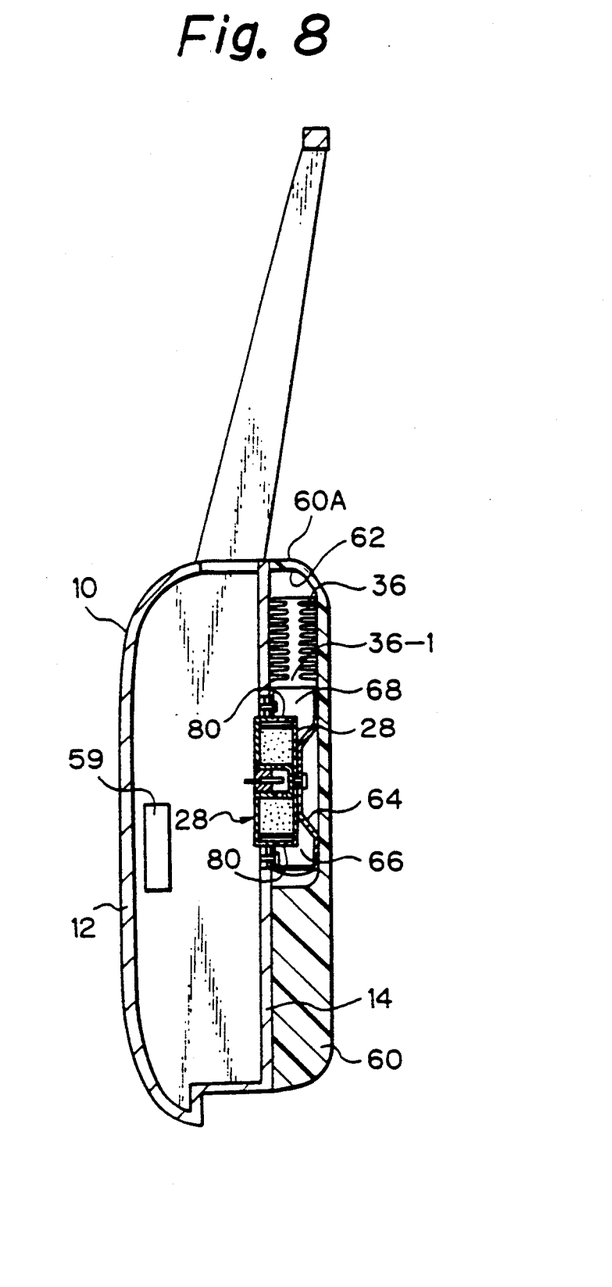
FIG. 8 is cross sectional view of the present invention, wherein an air bag is mounted to a door assembly.
Figure 9:
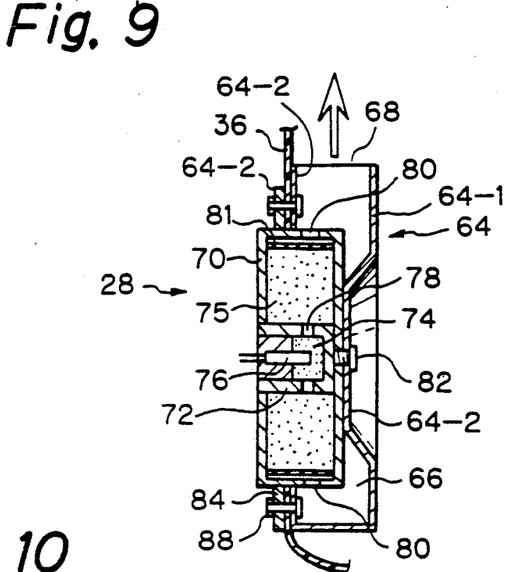
FIG. 9 is a cross sectional view of an inflator shown in FIG. 10 taken along line IX.
Figure 10:
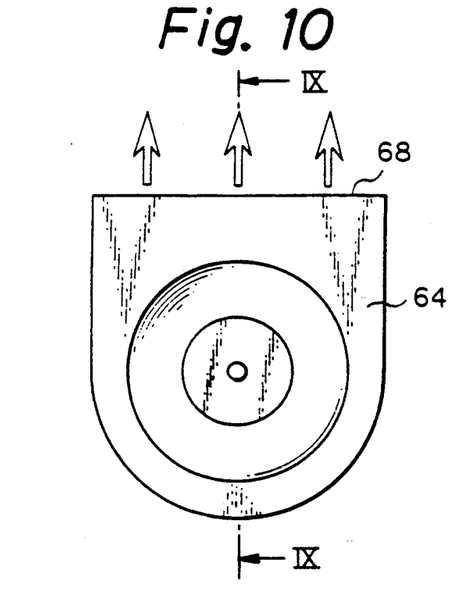
FIG. 10 is an alternative view of the inflator in FIG. 9.
Figure 11:
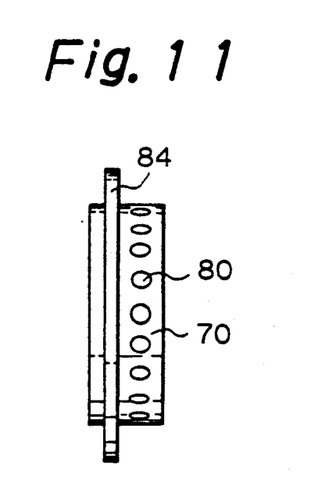
FIG. 11 is a side view of an inflator shown in FIG. 9.

FIG. 8 shows another embodiment wherein a door 10 has an outer panel 12 and an inner panel 14. A sensor 59 for detecting a collision is arranged in the door 10 at a position adjacent to the outer panel 12, and a pad 60, which is connected to the inner panel 14, has an inner recess 62 facing the inner panel 14, to thus define a space for storing an air bag device. The pad 60 has a breakable top wall 60A for allowing the air bag to be inflated outwardly. The air bag device includes an inflator 28, and an air bag 36 having a bellows-like construction which can be neatly folded. A guide casing 64 is, as shown in FIG. 10, flattened along the general plane of the door 10, which forms a semi-circular shape at its bottom and a rectangular shape at its top. The guide casing 64 has a first wall 64-1 and a second wall 64-2, between which a gas chamber 66 is formed. The guide casing 64 has a rectangular-shape mouth 68 connected to the chamber 66, for discharging the air therefrom into the air bag 36. The air bag 36 at the bottom end thereof, completely encloses the inflator 28 as well as the outer casing 64. As shown in FIG. 9, the inflator 28 is constructed by a disk-shaped inflator casing 70. A central compartment 72 is located in the casing 70 and has a space 74 therein for holding an ignitable powder material, and an annular chamber 75 is formed around the compartment of storing the gas generating powder material. A spark plug 76 is located in the chamber 74, for igniting the ignitable material stored therein. The compartment 72 has a tubular wall defining a plurality of openings 78, for transmitting flames from the central chamber 74 to the outside chamber 75. The inflator casing 70 has an annular wall defining a plurality of gas ejecting openings 80 (FIG. 11), which are opened to the space 66 inside the outer casing 64. Arranged inside the inner casing 70, along the entire inner periphery thereof and adjacent to the ejecting openings 80, is a filter 81. The first wall 64-1 of the guide casing 64 has a recessed portion 64-2 which is in contact with an upper wall of the inflator casing 70, and a bolt 82 is provided for connecting the latter with the portion 64-2. An annular flange 84 is integrally provided at the outer periphery of the inflator casing 70, and the flange 84 is connected to the lower wall 64-2 of the guide casing 64 by bolts and nuts 88, together with the bottom end of the inflator bag 36, as will be easily seen from FIG. 9. It should be noted that the flange 84 is also connected to the inner panel 14 of the door 10, by a suitable means (not shown). Further it should be noted that the gas guide panel 64 can be given an inner coating of a heat insulating material, to prevent a drop in the temperature of the gas ejected from the inflator 28.

Figure 12:
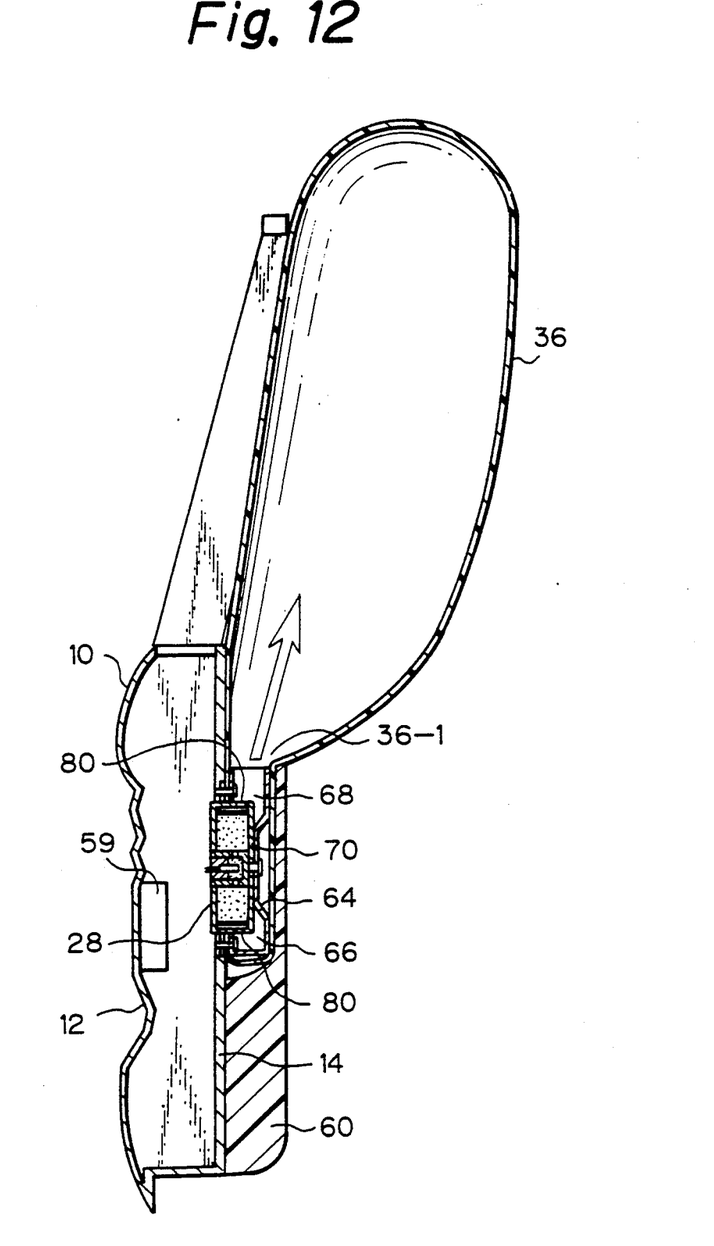
FIG. 12 is similar to FIG. 8, but shows the apparatus when the bag is inflated.

When the sensor 59 detects the occurrence of a collision, the ignition plug 76 is energized, and thus the ignitable material in the chamber 74 is ignited. As a result, flames are ejected into the chamber 75, which causes the gas generating material in the chamber 75 to generate a large amount of nitrogen gas. The thus generated nitrogen gas is first ejected into the chamber 66 via the gas ejecting nozzles 80, and then is ejected from the mouth 68 into the space inside the air bag 36 via the inlet 36-1. As a result of the introduction of this large amount of the gas, the portion 60A of the pad 60 is broken, and the air bag 36 is inflated to occupy the space between the side door and the passenger, as shown in FIG. 12.

Figure 13:
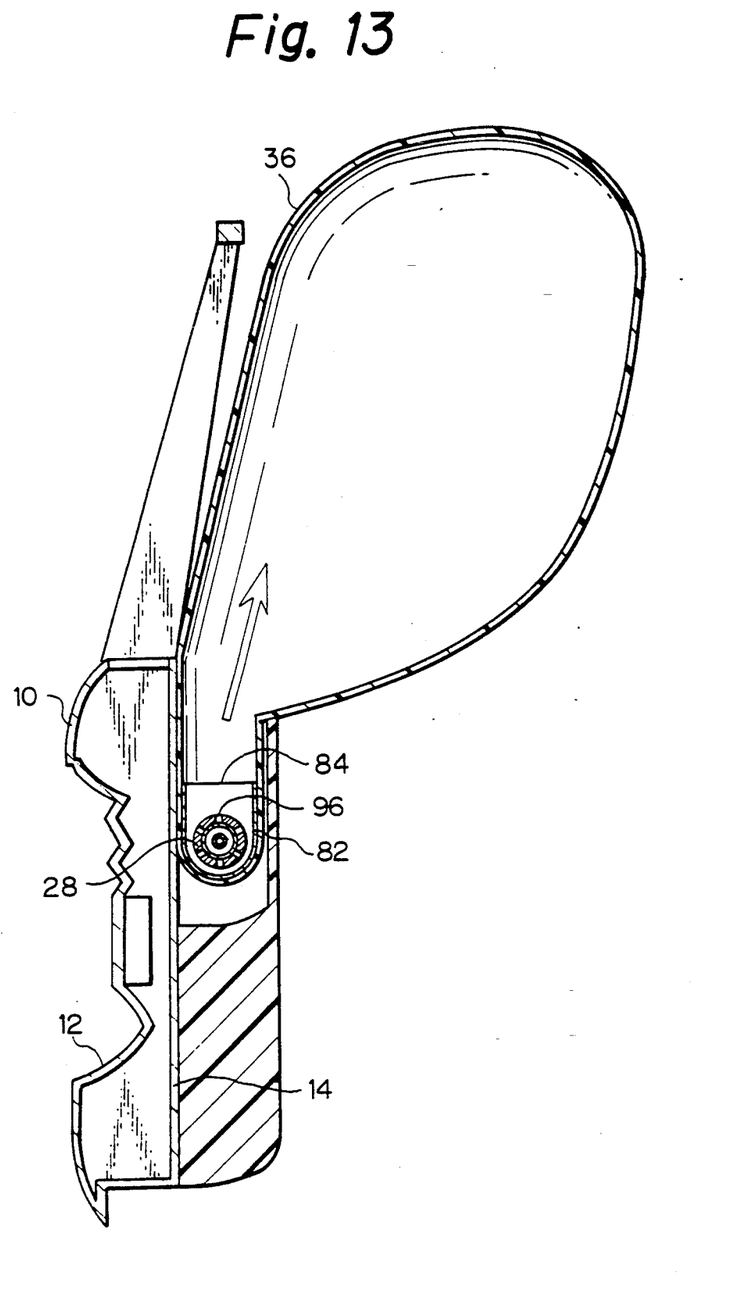
FIG. 13 is a cross sectional view of another embodiment, showing the bag when inflated.
Figure 14:
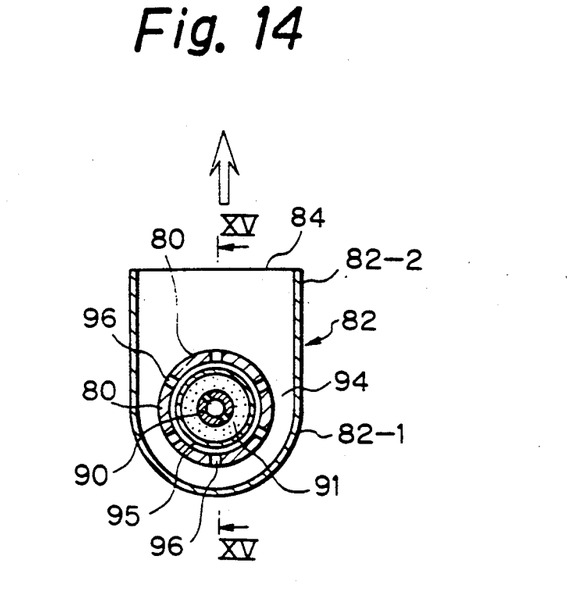
FIG. 14 is a transverse cross sectional view of an inflator shown in FIG. 13; and, FIG. 15 is a view taken along a line XV—XV in FIG. 14.
Figure 15:
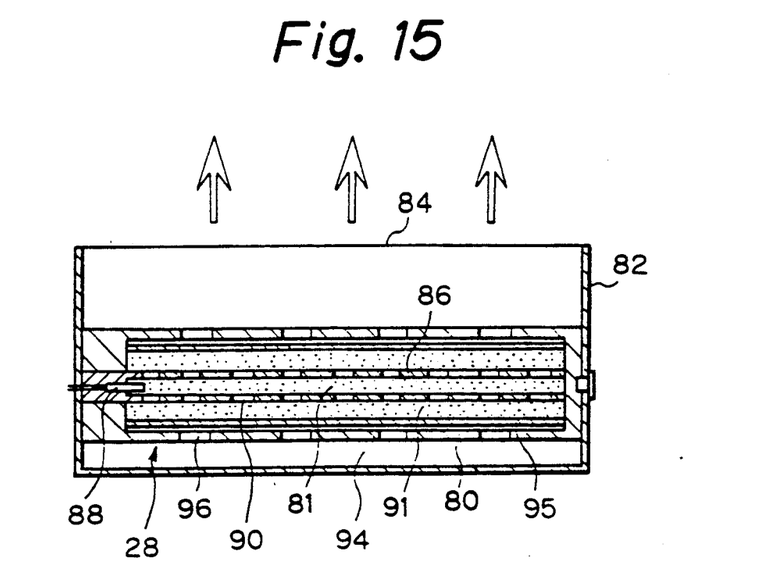

Another embodiment is shown in FIG. 13, wherein the bag is inflated. In this embodiment, an inflator 28 is constructed by an elongated cylindrical and closed casing 80, which extends horizontally along a general plane of the door 10. The inflator casing 80 is arranged in a guide casing 82. The casing 80 forms a bottom portion 82-1 having tubular shape with a semicircular cross section and a top portion having a rectangular cross section. The guide casing 82 has a mouth 84 which extends in a horizontal direction along the plane of the door 10. A tubular core member 86 is arranged inside the inflator casing 80, an ignitable material is stored in the space 81 inside the core member 86, and a ignition plug 88 is arranged to that it is in contact with the ignitable material in the member 86. The core member 86 has a plurality of nozzles 90 for allowing flames to be ejected into a chamber 91 inside the casing 80 storing the gas generating material inwardly from a tubular filter 95. As a result, the gas generating material is ignited, and a large amount of nitrogen gas is generated and discharged into the chamber 94 between the inflator casing 80 and the guide casing 82, via nozzles 96 formed on the cylindrical wall of the guide casing 82. Thus the nitrogen gas is discharged, via the mouth 84, to the space inside the air bag, causing it to be inflated so that it occupies the space between the door 10 and the passenger.

While embodiments of the present invention are described with reference to the attached drawings, many modifications and changes can be made by those skilled in this art without departing from the scope and spirit of the present invention.

We claim:

1. An air bag apparatus adapted to be mounted to a body of a vehicle, for protecting a passenger and comprising:

an air bag;

means for storing said air bag, in at least a partly retracted condition, at a location inside the vehicle body, laterally of the passenger;

means for detection of a collision; and means for injecting a flow of gas, when a collision is detected, directly upward into the air bag so that the air bag is inflated upward and the inflated bag couples a space between the passenger and the vehicle body, laterally of the passenger; wherein:

said vehicle body has an arm rest fitted laterally of the passenger, said storing means stores said air bag at least partly in said armrest, said gas injecting means discharges a flow of the gas upward from said arm rest; and said gas injecting means comprise an inflator for instantly generating a flow of gas and having an outlet, a gas discharge pipe having axially spaced first and second ends, the first end being open and the second end being closed, the opened end of the gas discharge pipe being connected to the outlet of the inflator for receiving the generated gas flow, the gas discharge pipe having a slit opened laterally to the pipe, and an elbow pipe having one end connected to said slit of the gas discharge pipe and a second end opened upward to the space inside the air bag, for obtaining a flow of the gas directed upward into the air bag.

2. An air bag apparatus adapted to be mounted to a body of a vehicle, for protecting a passenger and comprising:

an air bag;

means for storing said air bag, in at least a partly retracted condition, at a location inside the vehicle body, laterally of the passenger, means for detection of a collision; and means for injecting a flow of gas, when a collision is detected, directly upward into the air bag so that the air bag is inflated upward and the inflated bag occupies a space between the passenger and the vehicle body, laterally of the passenger; wherein:

said storing means stores said air bag in a wall of said vehicle laterally of the passenger, said gas injecting means discharges a flow of the gas upward from the side wall;

said storing means comprise a pad connected to the wall of the vehicle, the pad having at a top side thereof a breakable portion which is broken upon an inflation of the bag, and said gas injecting means comprise an inflator for generating a flow of the gas, a guide casing arranged around the inflator, the guide casing having a mouth opened upward so that the flow of the gas is directed into the air bag, and means for connecting the inflator and the guide casing to the wall of the vehicle body while being covered by the pad; and said inflator comprises an inflator casing, a central casing located inside the casing for storing an ignitable material therein, a gas generating material being filled in a space between the central casing and the inflator casing, the central casing having nozzles for generating flames caused by the ignition of the ignitable material, the inflator casing having nozzles for ejecting the flow of the gas toward the guide casing.

3. An air bag apparatus according to claim 2, wherein said vehicle body has a side portion defining a general plane along the side of the vehicle, and said casings have a generally flattened-disk shape with a circumference defining a general plane thereof which is substantially parallel to the general plane of the vehicle body.

4. An air bag apparatus according to claim 2, wherein said vehicle body has a side portion defining a general plane along the side of the vehicle, and said casings have a generally cylindrical shape, an axis of which is horizontally extended along the general plane of the vehicle body.

* * * * *